2,702,557

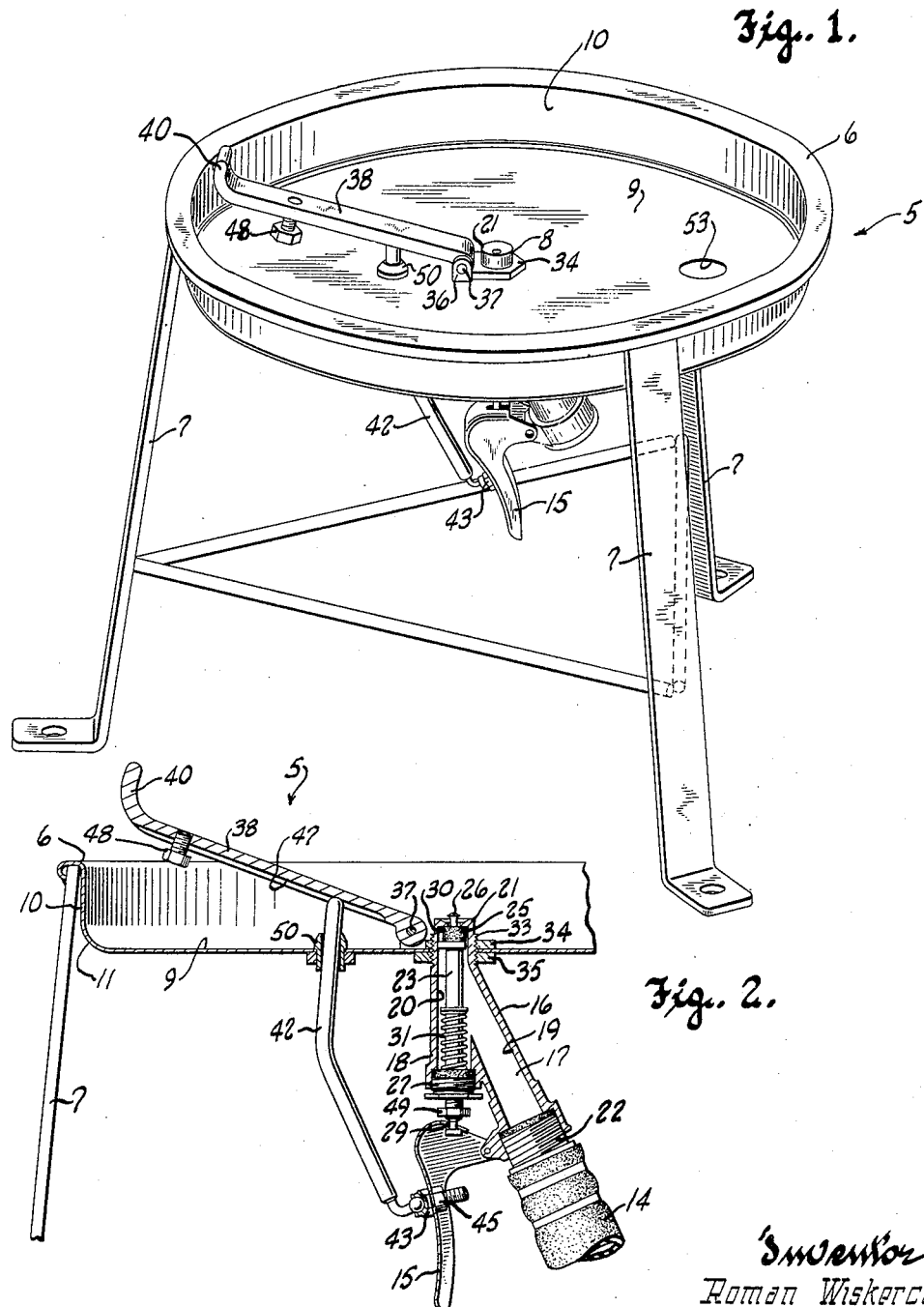

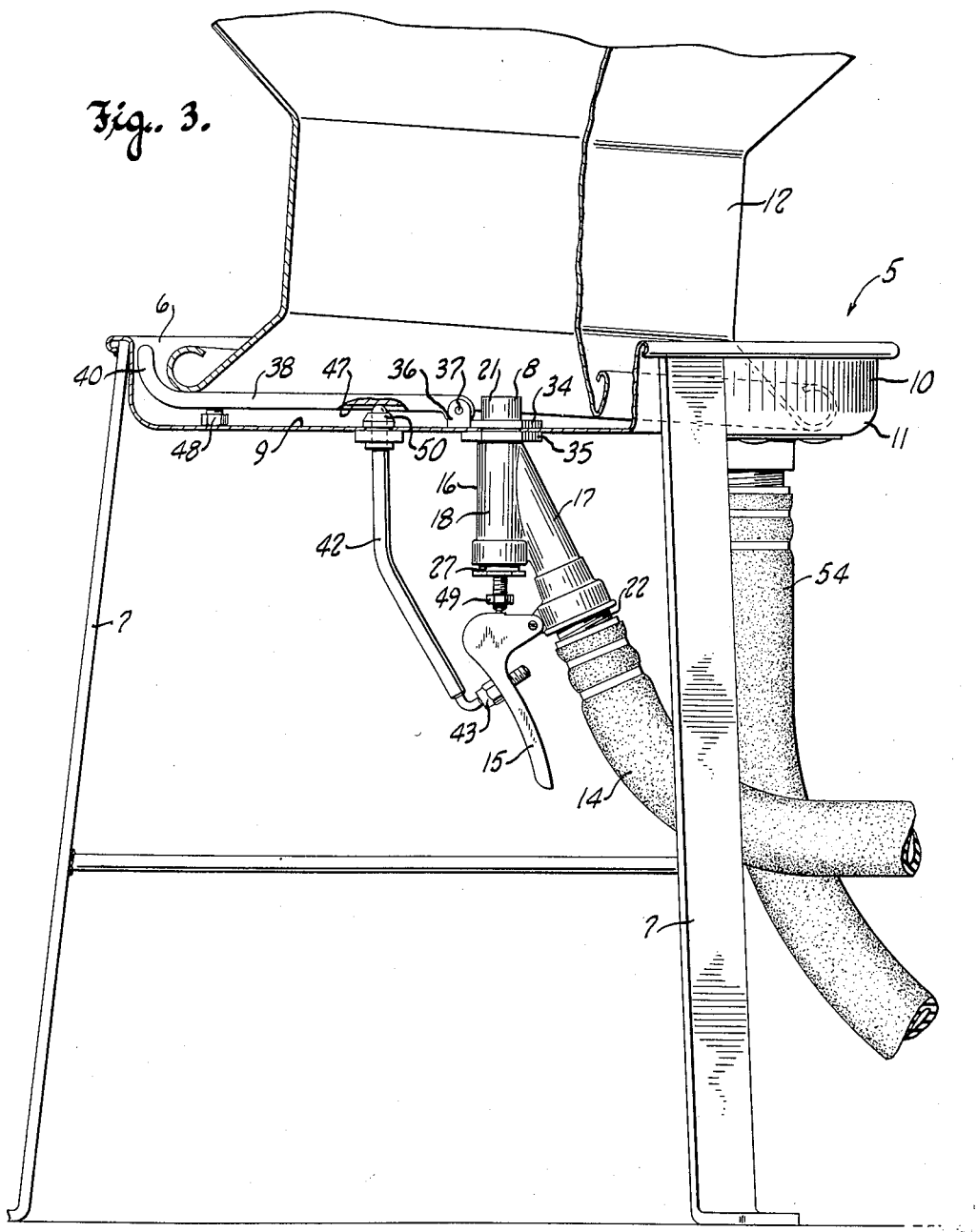

MILK CAN RINSING APPARATUS

Roman Wiskerchen, New Holstein, Wis.

Application July 30, 1953, Serial No. 371,289

3 Claims. (Cl. 134—52)

This invention relates to apparatus for rinsing milk cans and refers more particularly to a device which may be used by dairy farmers to facilitate the cleaning of a relatively small number of milk cans.

Milk cans are ordinarily cleaned and sterilized at the dairy or milk collection depot before being returned to the farmer, but it may be several days from the time when they are so cleaned before they are again put to use. During that interval dust or dirt may fall into the cans, and most dairy farmers therefore rinse and sterilize their cans before filling them, in order to disinfect them and eliminate bacteria and sediment. This is usually done by poring a sterilizing solution into the can and manually manipulating the can so that the fluid tends to rinse its interior. The contents are then usually poured into the next can and the operation repeated. Not only is this operation burdensome, involving the repeated lifting and tilting of milk cans, but it also tends to be rather messy because in the process of pouring out the contents of several cans a certain amount of liquid is almost inevitably spilled on the floor of the cleaning area.

With this situation in mind it is an object of the present invention to provide a very simple and inexpensive apparatus by which milk cans, cheese forms and similar containers may be rinsed preliminary to their use without any necessity for repeatedly lifting and tilting them to accomplish the rinsing process and without any necessity for manual manipulation of a hose nozzle. In connection with this object it is a further object of the present invention to provide an apparatus for rinsing milk cans and the like which will avoid the spilling of cleaning and rinsing fluid upon the floor of the cleaning area.

More specifically, it is an object of this invention to provide a device for washing and rinsing milk cans, with which device the washing operation may be accomplished by merely inverting a milk can and setting it on supporting means comprising a part of the device, and wherein placement of the milk can upon the device will open a valve and initiate the rinsing operation and removal of the can from the apparatus will automatically close the valve to terminate the operation.

Another object of the present invention is to provide a device for rinsing milk cans which is substantially automatic in operation, but which nevertheless is so inexpensive to manufacture and so simple to maintain as to be well within the means of any dairy farmer.

Still another object of this invention resides in the provision of a milk can rinsing apparatus of the character described which is adaptable for use with any type of fluid cleaning and rinsing agent and wherein liquid which has been sprayed into a milk can is collected in a container having a drain thereon to facilitate disposal of such liquid; and which apparatus, moreover, is easy to keep clean and inexpensive to operate.

A further object of this invention is to provide an automatic device for rinsing milk cans and which may also be employed as an efficient and attractive lawn sprinkler, or as a spray for dispensing disinfectant, fumigant or the like in an enclosure.

With the above and other objects in view, which will appear as the description proceeds, this invention resides in the novel construction, combination and arrangement of parts substantially as hereinafter described and more particularly defined by the appended claims, it being understood that such changes in the precise embodiment of the herein-disclosed invention may be made as come within the scope of the claims.

The accompanying drawings illustrate one complete example of the physical embodiment of the invention constructed according to the best mode so far devised for the practical application of the principles thereof, and in which:

Figure 1 is a perspective view of the device of this invention;

Figure 2 is a partial vertical sectional view of the device showing the valve mechanism thereof; and Figure 3 is a side view of the device of this invention with a milk can in operative position thereon, portions being cut away to show detail.

Referring now more particularly to the accompanying drawings in which like numerals designate like parts throughout the several views, the apparatus of this invention, designated generally by 5, comprises, in general, a shallow basin-like vessel 6, supported on legs 7 which hold it at a convenient height above the floor, and an upwardly opening nozzle 8 at the center of the vessel. The vessel has a flat bottom wall 9 and a low cylindrical side wall 10 joined to the bottom wall by a curved junction 11 of substantial radius, so that both the interior and exterior of the vessel are smooth and the vessel has no sharp corners in which dirt can collect. The diameter of the vessel is sufficiently large so that a milk can 12 may be supported thereon in inverted position with the top of the milk can entirely inside the side wall of the vessel.

The nozzle 8 preferably comprises a standard garden hose nozzle of the type shown and described in United States Letters Patent No. 2,064,794, and is adapted to be connected with a garden hose 14 of any usual type. As supplied, a nozzle of this type has a control lever 15 pivotally mounted on the nozzle body by which the flow of liquid from the nozzle may be started and stopped and the character of the stream of liquid issuing from the nozzle may be regulated to provide either a narrow jet or a more or less dispersed spray, and this lever is utilized in the device of the present invention to control the rinsing action of the apparatus, as will appear hereinafter.

The nozzle body 16 is substantially Y-shaped, and it is mounted on the vessel with its branches 17 and 18 below the bottom wall thereof and the stem of the Y, which comprises the nozzle outlet 21, projecting upwardly through the bottom wall of the vessel. One branch 17 of the nozzle body provides an inlet passage 19, while the other branch 18, which is coaxial with the nozzle outlet, comprises a valve chamber 20, which is in open communication with the inlet passage. The inlet branch 17 of the valve body is adapted to have a garden hose 14 connected thereto by means of a suitable nipple 22 at its lower end, while a valve stem 23 occupies the valve chamber branch of the nozzle body. At its upper end the valve stem carries a resilient valve element 25 by which the flow of liquid out of the nozzle may be started and stopped and a coaxial needle valve element 26 by which the character of the spray issuing from the nozzle may be regulated. The medial portion of the valve stem is axially slidably mounted in a bushing 27 which closes the lower end of the valve chamber, and the valve stem projects downwardly and outwardly beyond the bushing, its lower end portion being connected with the actuating lever, as at 29, so that the valve stem is reciprocated in consequence of swinging of the lever.

The resilient valve element 25 at the top of the valve stem is carried by such reciprocation of the valve stem into and out of seating engagement with a downwardly facing shoulder 30 in the valve chamber which is concentric with the outlet of the nozzle. A helical compression spring 31 in the valve chamber, surrounding the valve stem, reacts between a shoulder on the valve stem and the top of the bushing to bias the valve element upwardly to its seated position, wherein the valve element blocks the flow of liquid out of the nozzle from the inlet passage 19.

When the valve element 25 is drawn downwardly from its seat, against bias of the spring, liquid may of course flow out of the nozzle, but the upwardly and outwardly flared needle valve element 26, which projects upwardly beyond the resilient valve element 25, determines the type of flow which will obtain. When the valve element 25 is fully withdrawn from its seat and the valve stem is retracted to a position in which the top of the needle valve is below the nozzle mouth, a concentrated relatively narrow stream of liquid will issue from the nozzle. When the valve stem is raised to bring the widest part of the needle valve opposite the mouth of the nozzle, the stream of liquid flowing from the nozzle is deflected outwardly by the outwardly flared body of the needle valve and liquid issues from the nozzle in the form of a fine dispersed spray. Further advance of the valve stem upwardly will of course result in seating of the resilient valve element and consequent cessation of flow of liquid out of the nozzle.

The upper outlet portion 21 of the nozzle body, which extends through the bottom wall of the vessel, is threaded as at 33, to accommodate a pair of nuts 34 and 35, one below the bottom wall and one above it, by means of which the nozzle body is securely clamped to the bottom wall of the vessel. The upper nut 34 has a lateral extension thereon from which a pair of integral ears 36 project upwardly to support a hinge pin 37 upon which an arm 38 is pivotally mounted. The arm extends radially from its pivotal mounting to within a short distance of the cylindrical side wall of the vessel and is adapted to cooperate with the bottom wall of the vessel in supporting an inverted milk can on the device. An upwardly projecting lug 40 at the free end of the arm provides a stop or abutment whereby the rim of an inverted milk can is prevented from slipping off the end of the arm.

The arm is operatively connected with the valve actuating lever 15 by means of an endwise movable link or rod 42 whereby downward swinging motion of the arm in response to the weight of a milk can thereon is translated into valve opening movement of the lever, and whereby spring biased return of the lever to its valve closed position is translated into upward swinging of the arm. The link or rod is connected with the lever by a ball-and-socket joint, the socket portion 43 of which comprises a screw-like element having a socket in its head and which has its shank extending through a hole in the lever, to which it is secured by a nut 45.

It will be seen that the nozzle assembly for the device of this invention may be purchased as a standard part and need be modified only by threading its outlet end portion as already described and by the installation of the ball-and-socket connection to its actuating lever 15.

The upper end of the link or rod need not be positively connected with the arm because the arm and link are at all times biased toward one another, but the underside of the arm may be provided with a longitudinal central groove 47 to provide a good sliding engagement between the arm and the rounded upper end of the link.

It will now be apparent that when an inverted milk can is set in place on the device, the arm will be depressed by the weight of the can, automatically opening the valve to permit liquid to issue from the nozzle, and, assuming the hose 14 to be connected with a source of fluid under pressure, such fluid will be sprayed into the milk can until the can is removed from the device, whereupon the valve will move to its closed position in response to the bias of spring 31 and simultaneously the arm will swing upwardly to a position where it can be depressed by the next milk can placed on the apparatus.

The link necessarily extends through the bottom wall of the vessel and in order to prevent drainage liquid from dropping out of the vessel through the aperture provided for this link a bushing 50 extends through the bottom wall of the vessel and projects above the same a distance greater than the depth of drainage liquid which will normally accumulate in the vessel, thus preventing such liquid from flowing down out of the link aperture. Because the link has a certain amount of lateral motion it must have a loose fit in the bushing, but the arm 38 is substantially wider than the bore in the bushing and therefore the arm deflects drainage liquid away from the bushing and prevents it from draining through the bore thereof. A pipe flange secured to the bottom wall of the vessel, near one side thereof and in registry with a drainage hole 53 in the bottom of the vessel, provides for connection of a hose 54 or other duct by which drainage liquid may be conducted from the vessel to a sewer or other disposal point.

The supply hose 14 may be connected with a source of steam, water, or other cleaning agent, or may be successively connected with sources of cleaning and rinsing fluid, as by means of a selector valve (not shown), the installation and operation of which will be obvious.

Ordinarily the character of the stream emitted from the nozzle can be controlled by the operator tilting the milk can so as to slightly raise or lower the arm. Thus, when a can is first set in place on the device it may be permitted to fully depress the arm so that a coarse stream of liquid will be sent forcefully into the can to clean its bottom, and after a moment the can may be tilted slightly to raise the arm a bit, to a position at which the nozzle will emit a dispersed spray which will impinge upon the side walls of the can. If desired, however, an adjusting screw 48 may be threaded into the arm near its outer end, projecting below the underside of the arm to engage the bottom wall of the vessel and serve as a stop which limits downward motion of the arm in response to the weight of a milk can thereon and thus regulates the type of spray which will issue from the nozzle.

The nozzle used with the device of this invention is ordinarily provided with a thread on the lower projecting portion of the valve stem and a nut 49 is mounted thereon. This nut may be rotated along its thread to bring it into engagement with the underside of the bushing so that it will hold the valve in any desired open position against the bias of the spring. It will be seen that when this nut is employed to hold the valve open, the device of this invention is adaptable for use as a very efficient lawn sprinkler, or, if connected with a source of suitable fluid under pressure, it may be used as a spray dispenser for fumigating or disinfecting a room or other enclosure.

From the foregoing description, together with the accompanying drawings, it will be apparent that this invention provides an unusually simple and inexpensive device for rinsing individual milk cans, which device will be automatic in operation and will minimize the amount of handling required for cleaning such milk cans, and which, moreover, may be used as an efficient lawn sprinkler.

I claim:

1. Apparatus for cleansing and rinsing milk cans comprising: a shallow vessel having a substantially flat bottom wall and a low circumferential side wall projecting above said bottom wall, said bottom wall having an aperture near its center and a hole spaced from said aperture; a valved nozzle beneath said bottom wall of the vessel having a discharge end portion projecting up through said aperture, said nozzle being normally closed and having a pivotal operating lever actuatable to open the nozzle; means securing said nozzle on the vessel including a securement member secured to the discharge end portion of the nozzle and bearing against the upper surface of the bottom wall of the vessel to cooperate with the discharge end portion of the nozzle in closing said aperture against drainage of liquid therethrough; a control arm hingedly supported at one end by said securement member and extending across said hole in the bottom wall of the vessel; and a link extending through said hole and having one of its ends connected with said operating lever and its other end engaged by said control arm to provide for actuation of said pivotal operating lever and opening of the valved nozzle in consequence of downward swinging of said control arm.

2. The apparatus of claim 1, further characterized by a bushing in said hole and through which said link extends, said bushing projecting upwardly a distance from the bottom wall to prevent liquid that may accumulate in the vessel from draining through the bushing; and further characterized by means in said vessel spaced from said bushing providing a drain.

3. Apparatus for cleansing and rinsing milk cans, comprising: a shallow vessel including a relatively flat bottom wall and a cylindrical side wall projecting upwardly a short distance from the periphery of said bottom wall, the bottom wall having an aperture near the center thereof, and having a hole therein spaced from said aperture and a drain outlet spaced from said hole and said aperture; means on said bottom wall of the vessel providing a fitting communicating with said drain outlet, and with which a drain line may be connected to conduct waste liquid in the vessel to a point of disposal; a valved nozzle beneath said bottom wall and having a discharge end portion projecting up through said aperture, said valved nozzle being normally closed and having a pivotal operating lever actuatable to open the nozzle; means securing said nozzle on the vessel including a nut member threaded over the discharge end portion of the nozzle and bearing against the inner surface of the bottom wall of the vessel to cooperate with the discharge end portion of the nozzle in closing said aperture against drainage of liquid therethrough; a bushing in said hole and projecting upwardly a distance from the bottom wall to prevent liquid that may accumulate in the vessel from draining through the bushing; a link connected with said operating lever and projecting upwardly loosely through said bushing; and a control arm hingedly supported at one end by said nut member and resting on the projecting upper end of said link to provide for actuation of said pivotal operating lever and opening of the valved nozzle, through said link, in consequence of downward swinging of said control arm.

References Cited in the file of this patent

UNITED STATES PATENTS

| | | |
|---|---|---|
| 1,198,974 | Tremper | Sept. 19, 1916 |
| 1,619,973 | Haberman | Mar. 8, 1927 |